United States Patent Office 3,286,547
Patented Nov. 22, 1966

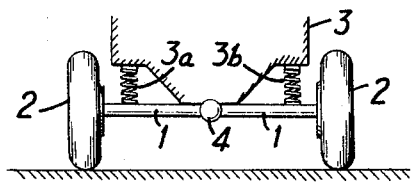 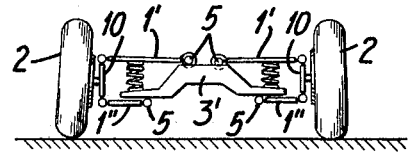
FIG. 1   FIG. 2
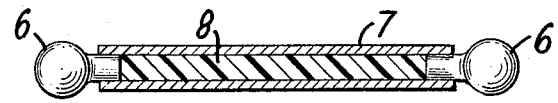
FIG. 3
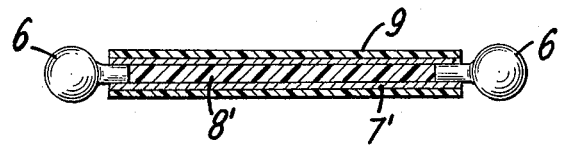
FIG. 4
FIG. 5
INVENTOR.
JÜRGEN ULDERUP
BY
McGlew & Toren
ATTORNEYS.

3,286,547
TUBULAR CONNECTING DEVICE
Jürgen Ulderup, Bergstrasse, Lemforde,
Hannover, Germany
Filed Oct. 12, 1964, Ser. No. 403,275
Claims priority, application Germany, Nov. 18, 1963,
U 10,280
7 Claims. (Cl. 74—579)

This invention relates in general to the construction of a suspension linkage and in particular to a new and useful suspension linkage for suspending the wheel axles and wheels of motor vehicles on the chassis frame and body of the vehicle.

The invention particularly relates to suspension linkages or connecting members which are generally called guide rods which are articulated on the frame or the body of a device, such as a motor vehicle, either in a plane transverse of the vehicle or in a plane longitudinally in respect to the vehicle, or inclined in respect thereto. Such a connecting member must be able to yield to the shocks and forces originating from the road in a vertical direction and in order to permit an independent suspension of the wheels. The guide rods serve, at the same time, as wheel guides as well as a support for the wheels and their axles with regard to the thrust forces appearing particularly during the starting and braking of the vehicle. In order to obtain a high rigidity, the guide rods or connecting members such as axle supports, struts, etc., are of a tubular form and have open, for example, U-shaped cross sections.

Connecting members of the type with which the invention is concerned have in the past had elastic means, such as rubber or rubber-like materials, arranged at the attachment point to attenuate the vibrations and noises which originate from the road. In order to obtain an effective noise absorption, the elastic insert must be relatively soft so that these parts have large dimensions and require an increase in the dimensions of the other bearing parts. Apart from the fact that the manufacturing costs are increased by such large dimensions, they also have the disadvantage that they render the accommodation of the resultant bearings difficult and this is particularly annoying in the axle regions of the motor vehicles. Use of voluminous soft inserts in the form of buffers, bushes, or shells, involves the risk that the joint connection will prove too susceptible to other stresses.

In accordance with the invention, the above disadvantages are overcome by providing a closed connecting element, for example, of tubular cross section, having a filling of sound insulating material. In a preferred arrangement, the filling consists of a material with an open cell structure. The construction ensures that the noises caused by the vibrations transmitted from the road are attenuated, or even partly or completely absorbed, in the connecting member during their propagation. The absorption of the noises is considerably enhanced by the use of materials which have a plurality of open cells. The introduction of such an insulating filling can be effected in a simple manner by foaming the cavity provided in the connecting member.

In another development of the invention, the outer surface of the connecting member can also be provided with a coating of sound insulating material. Preferably, a plastic is used for this purpose which is not susceptible to attack by dirt or grease and which is therefore highly resistant and provides an effective protection against corrosion damages on the connecting member.

According to another feature of the invention, the connecting member itself, which is generally made of tubular steel, is made of a plastic of high strength. A strength corresponding to the metallic connecting members can be obtained, for example, with plastics which are produced on the basis of a polyester-glass fiber formation.

The connecting member of the invention may be constructed with a complete filling of the cavity thereof with a gaseous or foaming material or with a partial filling or even no filling in accordance with whether the sound is to be absorbed to a greater or lesser extent. A foaming plastic material is particularly desirable and the sound insulation effect produced by said material is based on the fact that the oscillation energy in the cells of the material which are connected with each other by channels is destroyed by the results of the heat of friction.

An effect is thus achieved which goes beyond the pure attenuation of noises and which is particularly favorable in the noise sensitive joints between the axles and the wheels respectively and the chassis or body of the vehicle.

A further advantage of the construction of a connecting element in accordance with the invention is that the elastic insert necessary in the joints of the wheel and of the frame of the vehicle respectively on the basis of other stresses can now be designed independently of the requirement for sufficient noise reduction or even noise absorption and can thus be made smaller in many cases. It follows therefore that the other structural parts of these joints can also be made correspondingly smaller so that they are cheaper to produce and easier to accommodate.

Accordingly it is an object of this invention to provide an element for jointing wheel axles and wheels, respectively, of motor vehicles with the chassis or body, respectively, characterized in the provision of a connecting element which is preferably tubular and serves as a wheel suspension or wheel guide and which is filled internally with a sound insulating material, preferably a foaming plastic.

A further object of the invention is to provide a connecting element for wheels, axles, and the like which comprises a tubular element having sound insulating materials either formed as a portion of the element or interiorly thereof.

A further object of the invention is to provide a suspension mechanism which is simple in design, rugged in construction and economical to manufacture.

In the drawings:
FIG. 1 is a schematic representation of an independent front wheel suspension;
FIG. 2 is a schematic representation of a split jointed cross axle constructed in accordance with the invention; and
FIGS. 3–5 are transverse sectional views of various embodiments of a connecting member constructed in accordance with the invention.

Referring to the drawings in particular, the invention embodied therein comprises in FIG. 1 a vehicle frame or body 3 which is supported on an axle 1 having a central axle gear 4 with springs 3a and 3b being provided on each side as indicated. The axles 1 are supported on wheels 2, 2. The suspension indicated in FIG. 1 by way of example would include a joint at the axle gear 4 for supporting the axle 1 in an articulated manner and the axle 1 in turn is similarly connected with the wheel 2.

In FIG. 2 another embodiment of suspension is indicated which includes separate axle elements 1', 1' which are supported on a body or frame 3' by means of ball joint elements 5, 5 carried on each axle which are received in suitable sockets (not shown) of the frame 3'. Similar suspension joints 5 are indicated for axle elements 1" both in respect to the connection to the chassis or body 3' and to a wheel rod 10.

As indicated particularly in FIGS. 3, 4 and 5, the connection can be effected, for example, by means of a spherical connection piece or ball 6 which is supported in a corresponding housing or socket member which is suitably lined with bearing material or roller bearings to permit the articulated movement thereof. In FIG. 3 the connecting member advantageously comprises a tubular steel element 7 whose inner cavity is filled with a sound insulating plastic having an open cell structure. The ends of the tubular steel element are closed by the connecting pieces 6 forming ball joints which permit articulation of the member.

In FIG. 4 the connecting member 7′ is indicated which is covered on the outside by a sheath 9 of sound insulating material. If necessary, the inner cavity is also filled with an insulating or foaming plastic material 8′.

In FIG. 5 the connecting member 7″ is provided which is made of a plastic having a high strength comparable to that of tubular steel and which may preferably be made from a polyester plastic reinforced with glass fibers 10′.

The invention may be applied with the same or a similar effect to axle units, supports or other elements, for example, a cross or longitudinal tube serving as a bearing housing for torsion bar springs.

What is claimed is:

1. An element for mounting articulated parts, such as for joining wheel axles and wheels with a chassis frame or body in a motor vehicle comprising a metal connecting element of tubular configuration, a ball member having an axially extending plug portion extending into and closing each end of said tubular element, and an insulating material of open cellular plastic material extending around and through said tubular member and providing a sound insulation.

2. An element for mounting articulated parts, such as for joining wheel axles and wheels with a chassis frame or body in a motor vehicle comprising a connecting element of tubular configuration, a ball member having an axially extending cylindrical plug portion extending into and closing each end of said tubular element, and a sound insulating material on the interior of said tubular member and extending between said ball members and providing a sound insulation, said insulating material being a foaming plastic of open cell structure.

3. An element for mounting articulated parts, such as for joining wheel axles and wheels with a chassis frame or body in a motor vehicle comprising a connecting element of tubular configuration, means closing each end of said tubular element, an insulating material connected to said tubular member and providing a sound insulation, said insulating material being a foaming plastic of open cell structure and being contained within said tubular configuration.

4. An element for mounting articulated parts, such as for joining wheel axles and wheels with a chassis frame or body in a motor vehicle comprising a connecting element of tubular configuration, means closing each end of said tubular element, said means including a ball member on at least one end, an insulating material of open cell structure located within said tubular member and providing a sound insulation, and additional insulating material being formed around the exterior of said tubular configuration.

5. An element for mounting articulated parts, such as for joining wheel axles and wheels with a chassis frame or body in a motor vehicle comprising a connecting element of tubular configuration, means closing each end of said tubular element, said means including a ball member on at least one end, an insulating material connected to said tubular member and providing a sound insulation, said insulating material comprising said tubular configuration with at least the interior portion being of an open cell plastic material.

6. An element for mounting articulated parts, such as for joining wheel axles and wheels with a chassis frame or body in a motor vehicle, comprising a connecting element of tubular configuration, means closing each end of said tubular element, said means including a ball member on at least one end, an insulating material of open cell plastic material located within said connecting element and providing a sound insulation, said connecting element of tubular configuration being formed of a plastic material having high strength.

7. An element according to claim 6 wherein said plastic material of high strength is a plastic material having polyester glass fiber compounds therein.

References Cited by the Examiner

UNITED STATES PATENTS

| 1,449,973 | 3/1923 | Coyle | 123—90 |
| 1,829,305 | 10/1931 | Sneed | 74—579 |
| 2,897,805 | 8/1959 | Etzler | 123—90 |
| 2,095,416 | 10/1937 | Lefevre | 74—579 |
| 2,991,808 | 7/1961 | Siegmann et al. | 138—125 |
| 3,010,357 | 11/1961 | Hirschowitz | 64—2 |
| 3,159,698 | 12/1964 | Suh et al. | 18—5 |

FRED C. MATTERN, Jr., *Primary Examiner.*
BROUGHTON G. DURHAM, *Examiner.*
W. S. RATLIFF, Jr., *Assistant Examiner.*